(12) United States Patent
Sun et al.

(10) Patent No.: US 8,078,295 B2
(45) Date of Patent: Dec. 13, 2011

(54) ACCUMULATIVE METHOD FOR ESTIMATING VELOCITY LIMITATION

(75) Inventors: Chin-Chu Sun, Hsinchu (TW);
Shih-Chang Liang, Hsinchu (TW);
Wan-Kun Chang, Hsinchu (TW);
Yung-Ming Kao, Hsinchu (TW);
Cheng-Yu Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 459 days.

(21) Appl. No.: 12/366,598

(22) Filed: Feb. 5, 2009

(65) Prior Publication Data

US 2010/0094435 A1 Apr. 15, 2010

(30) Foreign Application Priority Data

Oct. 13, 2008 (TW) .............................. 97139267 A

(51) Int. Cl.
*G05B 11/32* (2006.01)
*G06F 19/00* (2006.01)

(52) U.S. Cl. ............ 700/69; 700/95; 700/184; 700/189; 700/190; 700/191; 700/192; 700/193; 700/245

(58) Field of Classification Search .................... 700/69, 700/95, 189, 194, 245, 184, 190–193
See application file for complete search history.

(56) References Cited

U.S. PATENT DOCUMENTS

| | | | | | |
|---|---|---|---|---|---|
| 3,727,191 | A | * | 4/1973 | McGee | 700/188 |
| 3,882,304 | A | * | 5/1975 | Walters | 700/163 |
| 3,969,615 | A | * | 7/1976 | Bowers et al. | 700/189 |
| RE30,016 | E | * | 5/1979 | Hohn | 700/253 |
| 4,214,309 | A | * | 7/1980 | Koide et al. | 700/172 |
| 4,365,300 | A | * | 12/1982 | Johanson et al. | 700/162 |
| 4,370,720 | A | * | 1/1983 | Hyatt | 700/194 |
| 4,528,632 | A | * | 7/1985 | Nio et al. | 700/189 |
| 4,708,544 | A | * | 11/1987 | Faulstich et al. | 409/12 |
| 4,757,457 | A | | 7/1988 | Matsumoto | |
| 4,903,213 | A | * | 2/1990 | Buhler et al. | 700/189 |
| 4,979,121 | A | * | 12/1990 | Inoue et al. | 700/194 |
| 5,197,014 | A | * | 3/1993 | Seki et al. | 700/189 |
| 5,751,586 | A | * | 5/1998 | Grabovac | 700/169 |

(Continued)

OTHER PUBLICATIONS

Kim et al., "Design of Digital Signal Processor System of CNC Systems" IEEE, 1991, p. 1861-1866.*
Kim et al., "Full Digital Joint Motion Controller for Industrial Robot and CNC Machine Tool", IEEE, 1994, p. 1613-1820.*

*Primary Examiner* — Albert Decady
*Assistant Examiner* — Thomas Stevens

(57) ABSTRACT

A method for controlling acceleration and deceleration before interpolating is provided. The method includes steps of previewing and analyzing a processing program to estimate a limitation of a processing velocity and distributing a processing velocity according to the limitation. The step of previewing and analyzing a processing program includes substeps of providing the processing program including a pathway formed by plural blocks, unitizing the motion vector of each block into the unit vector $$\left(\hat{N}_i = \frac{\overline{N}_i}{\|\overline{N}_i\|}\right),$$

calculating a length ($DV_i = \|\overrightarrow{DV}_i\|$) of a vector difference in the unit vectors between each block and its next block ($\overrightarrow{DV}_i = \hat{N}_i - \hat{N}_{i+1}$), calculating a sum of the length of the vector difference in a distance from a starting block ($S = \Sigma DV_n$), and calculating the limitation of the processing velocity for an end of each block ($V_{lim}$) according to an inverse ratio of the sum (1/S).

4 Claims, 3 Drawing Sheets

U.S. PATENT DOCUMENTS

| | | | |
|---|---|---|---|
| 6,341,245 B1 * | 1/2002 | Ueta et al. | 700/194 |
| 6,782,306 B2 * | 8/2004 | Yutkowitz | 700/189 |
| 6,832,128 B2 * | 12/2004 | Haupt | 700/184 |
| 7,400,939 B2 * | 7/2008 | Nagasaka | 700/245 |
| 7,792,604 B2 * | 9/2010 | Hong et al. | 700/188 |
| 2003/0033050 A1 * | 2/2003 | Yutkowitz | 700/189 |
| 2003/0125830 A1 * | 7/2003 | Munz | 700/189 |
| 2004/0181307 A1 * | 9/2004 | Hirai et al. | 700/194 |

\* cited by examiner

ACCUMULATIVE METHOD FOR ESTIMATING VELOCITY LIMITATION

FIELD OF THE INVENTION

The present invention relates to a method for estimating the velocity limitation using the acceleration and deceleration before interpolating in a numerical controller, and more particular to an accumulative method for estimating the velocity limitation.

BACKGROUND OF THE INVENTION

The development of the controller for the machine needs to reach the requirements of high velocity, high accuracy and the high-quality cutting surface. For meeting the above requirements, the controller using the controlling method of acceleration and deceleration before interpolating is developed, which is able to decrease the contouring error caused by the controlling method of acceleration and deceleration after interpolating. However, for achieving the motion control using the method of acceleration and deceleration before interpolating, the controller has to preview and analyze the processing pathway to decide the location for acceleration or deceleration and the velocity distribution in the processing pathway, to be the basis of the interpolating for the motion control.

In the prior arts, there are two commonly used estimating methods. One estimating method is the velocity difference estimating method in the U.S. Pat. No. 4,757,457, which uses the velocity difference caused by each axle of the machine passing through two adjacent blocks in a corner to be the basis of the limitation for the processing velocity in the corner. However, this method is easy to cause the over speed situation in the processing pathway formed by successive blocks. The other estimating method is the triangle difference estimating method, which uses the angle formed by two adjacent blocks where the machine passing through and the parameter of the server circuit to be the basis of the limitation for the processing velocity in the corner. This method is also easy to cause the over speed situation in the processing pathway formed by successive blocks.

Therefore, how to find the portions having steep orientation variations in the processing pathway and how to control the acceleration and deceleration appropriately so as to prevent the machine from exceeding the acceleration and deceleration property of the server are important. Under such background, it is necessary to develop a simple algorithm to calculate the limitation for the processing velocity of each block end in the corner of the processing pathway.

In order to overcome the drawbacks in the prior art, an accumulative method for estimating the velocity limitation is provided. The particular design in the present invention not only solves the problems described above, but also is easy to be implemented. Thus, the invention has the utility for the industry.

SUMMARY OF THE INVENTION

In accordance with an aspect of the present invention, a method for controlling acceleration and deceleration before interpolating is provided. The method includes the steps of previewing and analyzing a processing program to estimate a limitation of a processing velocity, which comprises providing the processing program including a pathway formed by plural blocks; calculating an unit vector of moving direction of each block $$\left( \hat{N}_i = \frac{\overline{N_i}}{\|\overline{N_i}\|} \right);$$

calculating a length ($DV_i = \|\overrightarrow{DV_i}\|$) of a vector difference in the unit vectors between each block and its next block ($\overrightarrow{DV_i} = \hat{N}_i - \hat{N}_{i+1}$); calculating a sum of the length of the vector differences in a distance from a starting block ($S = \Sigma DV_n$); and calculating the limitation of the processing velocity for an end of each block ($V_{lim}$) according to an inverse ratio of the sum ($1/S$); and distributing a processing velocity according to the limitation.

According to the method described above, the distance is determined according to one of a processing feature and a machine feature.

According to the method described above, the processing feature is a curvature of the pathway.

According to the method described above, each block and its next block have an included angle therebetween.

Preferably, the method described above further includes a step of generating a motion interpolation according to the manufacturing velocity.

Preferably, the method described above further includes a step of driving a serving driver according to the motion interpolation.

In accordance with another aspect of the present invention, an accumulative method for estimating a processing velocity limitation is provided. The accumulative method includes the steps of providing a processing program including a pathway formed by plural blocks; unitizing a motion vector of each block into an unit vector $$\left( \hat{N}_i = \frac{\overline{N_i}}{\|\overline{N_i}\|} \right);$$

calculating a length ($DV_i = \|\overrightarrow{DV_i}\|$) of a vector difference in the unit vectors between each block and its next block ($\overrightarrow{DV_i} = \hat{N}_i - \hat{N}_{i+1}$); calculating a sum of the length of the vector differences in a distance from a starting block ($S = \Sigma DVn$); and calculating the processing velocity limitation for an end of each block ($Vlim$) according to an inverse ratio of the sum ($1/S$).

According to the accumulative method described above, each block and its next block have an included angle therebetween.

According to the accumulative method described above, the distance is determined according to one of a manufacturing feature and a machine feature.

According to the accumulative method described above, the manufacturing feature is a curvature of the pathway.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

In the present invention, the analyzed processing pathway is used to accumulatively calculate the vector difference of the processing pathway, the vector difference is used to estimate the limitation for the processing velocity, and the limitation for the processing velocity is used to perform the motion control for the acceleration and deceleration before interpolating. In this way, the processing accuracy and the yield of products will be significantly enhanced.

Figure 1:
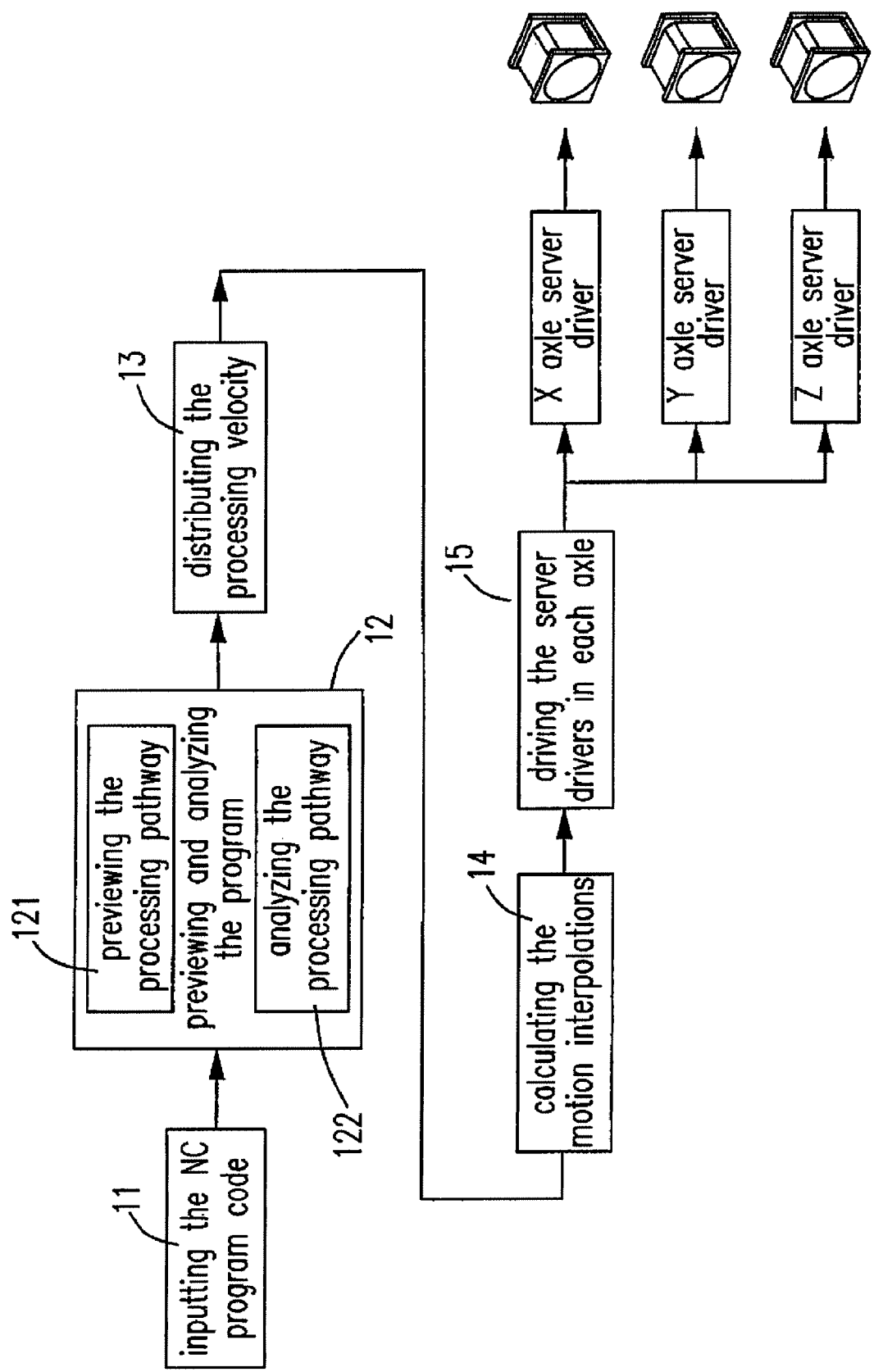
FIG. 1 is a flow chart of the motion control for the acceleration and deceleration before interpolating.

Please refer to FIG. 1, which is the flow chart of the motion control for the acceleration and deceleration before interpolating. The motion control includes the following steps. The step 11 is inputting the NC program code. The step 12 is previewing and analyzing the program in the CNC controller, which comprises the step 121, previewing the processing pathway, and the step 122, analyzing the processing pathway, so as to obtain the limitation for the processing velocity. The step 13 is distributing the processing velocity according to the limitation. The step 14 is calculating the motion interpolations based on the contributions of the processing velocity. The step 15 is driving the server driver in each axle according to the motion interpolations to make the machine manufacture the products in a way more meeting the processing pathway shown by the program code.

Figure 2:
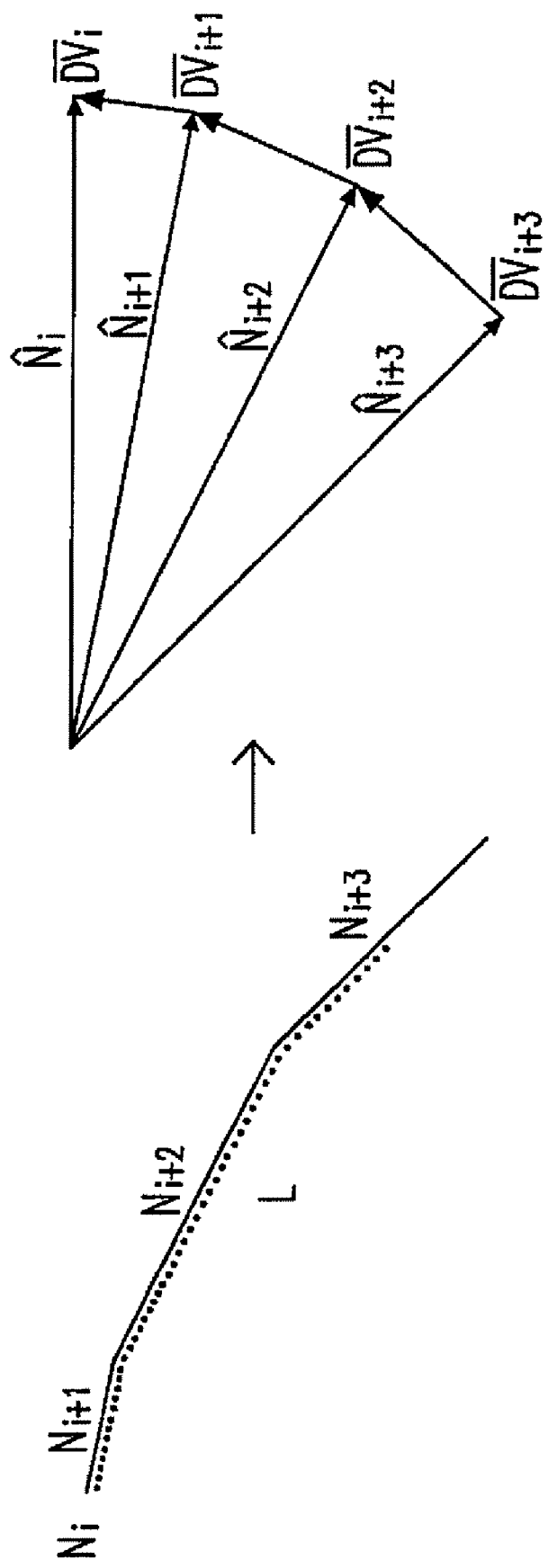
FIG. 2 is a diagram showing the accumulative method for estimating the velocity limitation according to a preferred embodiment of the present invention.
Figure 3:
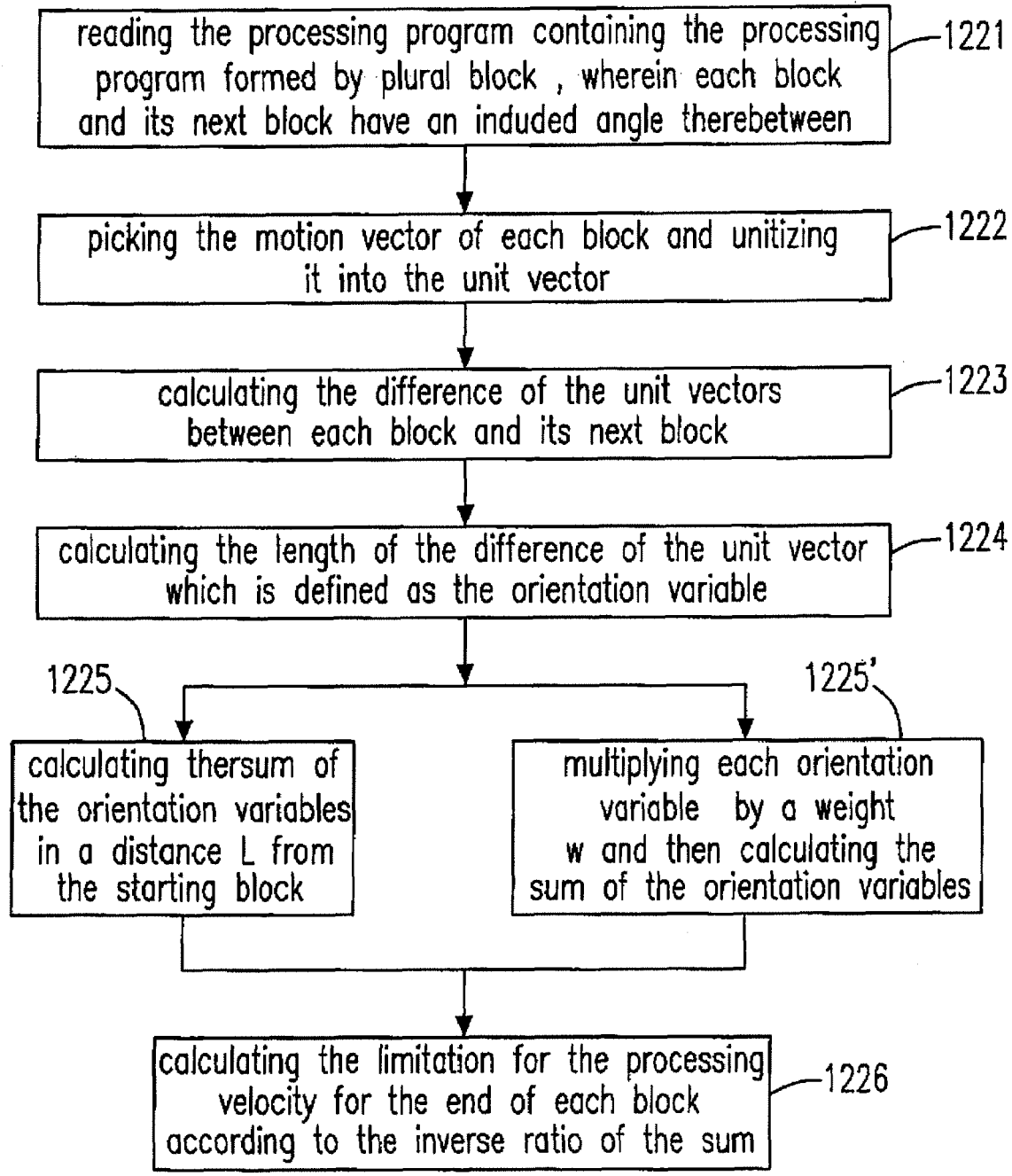
FIG. 3 is a flow chart of the accumulative method for estimating the velocity limitation according to a preferred embodiment of the present invention.

The step 122, analyzing the processing pathway, is performed by using the following sub-steps. Please refer to FIGS. 2 and 3, wherein FIG. 2 is the diagram showing the accumulative method for estimating the velocity limitation according to a preferred embodiment of the present invention, and FIG. 3 is the flow chart of the accumulative method for estimating the velocity limitation according to a preferred embodiment of the present invention. In the beginning, the step 1221 is reading the processing program containing the processing pathway formed by plural blocks, wherein each block and its next block have an included angle therebetween.

The step 1222 is picking the motion vector $\vec{N}_i$ of each block and unitizing it into the unit vector $\hat{N}_i$, as shown in Formula 1.

$$\hat{N}_i = \frac{\vec{N}_i}{\|\vec{N}_i\|} \quad \text{Formula 1}$$

The step 1223 is calculating the difference of the unit vectors between each block and its next block, as shown in Formula 2.

$$\vec{DV}_i = \hat{N}_i - \hat{N}_{i+1} \quad \text{Formula 2}$$

The step 1224 is calculating the length of the difference which is defined as the orientation variable, as shown in Formula 3.

$$DV_i = \|\vec{DV}_i\| \quad \text{Formula 3}$$

The step 1225 is calculating the sum of the orientation variables in a distance L from the starting block, when the velocity limitation of the end of the $N^{th}$ block is calculated, as shown in Formulas 4 and 5:

$$S = \sum_{n=i}^{j} DV_n \quad \text{Formula 4}$$

wherein j meets $$\sum_{n=i+1}^{j} \|\vec{N}_n\| < L < \sum_{n=i+1}^{j+1} \|\vec{N}_n\|. \quad \text{Formula 5}$$

Finally, the step 1226 is calculating the limitation for the processing velocity for the end of each block according to the inverse ratio of the sum, as shown in Formula 6:

$$V_{lim} = C/S \quad \text{Formula 6}$$

wherein L and C are changeable according to the differences of the processing property or the machines.

Besides, there is a further step 1225' of multiplying each orientation variable by a weight W and then calculating the sum of the orientation variables, as shown in Formula 7, wherein the weight W is a variable gradually descending according to the distance between the position of the orientation variable and the estimated Ni block.

$$S = \sum_{n=i}^{j} (W_n \cdot DV_n) \quad \text{Formula 7}$$

Accordingly, the velocity limitation for the end of each block in the processing pathway can be estimated precisely by using the accumulative method for estimating the velocity limitation in the present invention, and the processing velocity can be precisely distributed based on the velocity limitation to make the processing velocity more meet the practical variations in the processing pathway. Thus, the contouring error of the product and the vibration of the machine can be decreased by this better velocity distribution.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling acceleration and deceleration before interpolating, comprising steps of:
    previewing and analyzing a processing program to estimate a limitation of a processing velocity, which comprises:
        providing the processing program including a pathway formed by plural blocks;
        unitizing a motion vector of each block into an unit vector $$\left(\hat{N}_i = \frac{\overline{N}_i}{\|\overline{N}_i\|}\right);$$

calculating a length ($DV_i = \|\overrightarrow{DV_i}\|$) of a vector difference in the unit vectors between each block and its next block ($\overrightarrow{DV_i} = \hat{N}_i - \hat{N}_{i+1}$);

calculating a sum of the length of the vector differences in a distance from a starting block ($S = \Sigma DVn$); and calculating the limitation of the processing velocity for an end of each block (Vlim) according to an inverse ratio of the sum (1/S);

distributing a processing velocity according to the limitation;

generating a motion interpolation according to the processing velocity; and driving a serving driver according to the motion interpolation.

2. A method as claimed in claim 1, wherein the distance is determined according to one of a processing feature and a machine feature.

3. A method as claimed in claim 2, wherein the processing feature is a curvature of the pathway.

4. A method as claimed in claim 1, wherein each block and its next block have an included angle therebetween.

* * * * *